United States Patent Office 2,831,845
Patented Apr. 22, 1958

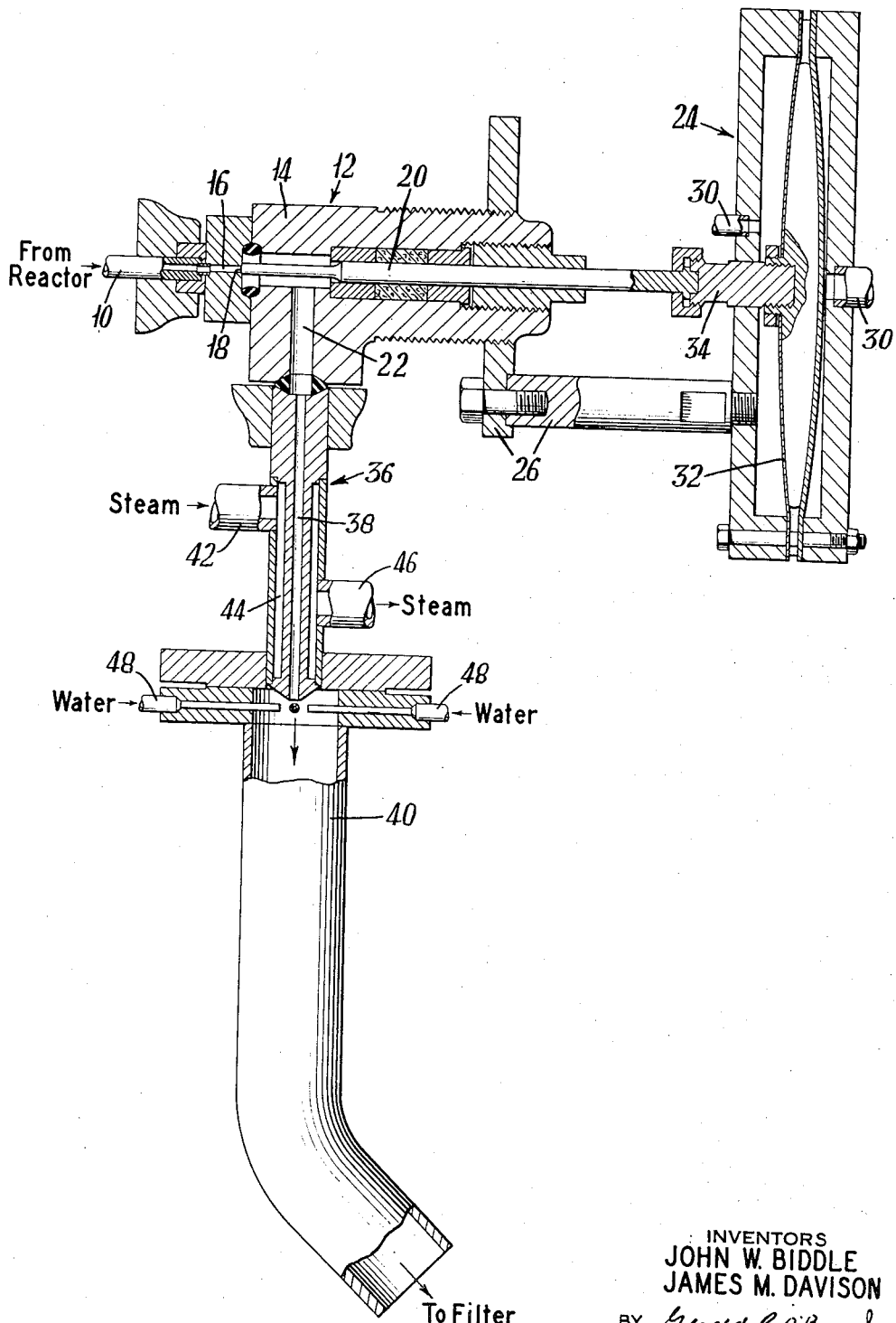

2,831,845

PROCESS FOR THE PRODUCTION OF POWDERED POLYMERS AND COPOLYMERS OF ETHYLENE

John W. Biddle and James M. Davison, Charleston, W. Va., assignors to Union Carbide Corporation, a corporation of New York Application June 28, 1955, Serial No. 518,466

4 Claims. (Cl. 260—94.9)

The present invention relates to a novel process for the production of powdered polymers and copolymers of ethylene.

Heretofore, solid polymers and copolymers of ethylene were made by reacting ethylene either alone or with other monomers at pressures above 500 atmospheres and at temperatures above 100° C. In continuous processes for polymerization, the product was collected as a melt in a collector vessel where the unreacted gas was then separated. One disadvantage of such processes is that, because of the necessity of always maintaining a level of molten polymer in the collector vessel and so holding the polymer for extended periods of time at temperatures in excess of its melting point, a portion of the polymer was subjected to thermal degradation. Another disadvantage is that the viscous polymer can not be drained completely from the collector vessel, therefore, contamination by carbon black from decomposition is difficult to remove. A further disadvantage is that, although the pressure in the collector vessel can be controlled so that extrusion of the polymer matches the make rate for polymers of various viscosities, difficulties are encountered during extrusion of polymers of very low or very high viscosities.

The prime object of the present invention is to provide a process for collecting polymer from the reaction vessel without hold-up and without thermal abuse of the polymer.

A further object is to provide a process which yields powdered polymers and copolymers without subsequent processing steps.

Other aims and advantages of the present invention will be apparent from the following description and appended claims.

In accordance with the present invention, a reaction product containing polymers or copolymers of ethylene, together with some unreacted monomer, is released from a high pressure to substantially atmospheric pressure and the high velocity jet of atomized molten polymer or copolymer so produced is injected into a quenching fluid stream which rapidly cools and freezes the atomized polymer or copolymer into a fine powder which can be readily separated from the unreacted monomer and quenching fluid and dried.

It has been found that the process of the invention is unaffected by the contamination of the polymer or copolymer of the reaction product with quantities of unreacted reactant gas molecules. For example, the presence of unreacted gaseous ethylene in a polyethylene reaction product does not effect the attainment of a powdered polyethyelene product, and the process of the invention provides a means for separating the polymer or copolymer from such unreacted monomer.

It has also been found necessary, in order to insure the production of powdered polymer or copolymer, to accomplish a pressure reduction of the reaction product such as will produce a stream of molten atomized product having a velocity in excess of 100 feet per second prior to quenching. When the velocity falls below this value, the process is not successful in producing a powdered product.

Apparatus suitable for the practice of the process of the invention is shown, partially in section, in the single figure of the drawing. As there shown, conduit 10 conveys the reaction product of polymer or copolymer of ethylene (together with unreacted monomer) from the reaction zone at high temperature and pressure. Pressure reducing valve 12 is provided having an outer body 14, inlet port 16, seat 18, stem 20 and outlet port 22: A diaphragm-type valve control member 24 is provided for adjusting the position of valve stem 20 and, in turn, regulating the pressure drop in reducing valve 14. Valve control member 24 is secured to the outer body 14 of the reducing valve by bracket 26, and comprises gas inlet ports 30, diaphragm 32, and valve rod 34 connecting diaphragm 32 and valve stem 20. By applying a properly chosen continuous or intermittent pressure to diaphragm 32 the continuous or intermittent operation of pressure reducing valve 12 is affected, discharging reactants through the valve to injector member 36 having a longitudinal injector passage 38 communicating with outer port 22 with reducing valve 12 and discharging the upper end of quenching conduit 40. Steam jacket heating means is provided comprising an inlet 42, a radial passage 44, surrounding longitudinal injector passage 38, and an outlet passage 46 for passing steam around the injector member to maintain the reactants fluid and preventing clogging of the injector passage 38 with the reactant. A plurality of water quenching ports 48 are radially disposed at the upper end of quenching conduit 40 and intersect so as to form a screen of quenching fluid, such as the water, through which the stream of atomized reactants is injected and quenched.

After quenching, the atomized reactants and quenching water pass through conduit 40 to separating means, such as a filter, for separating the powdered polymer or copolymer from the quenching fluid. It has been found that the jet of atomized reactants discharged from the outlet end of longitudinal injector passage 38 must be of small diameter in order to insure the efficient quenching thereof, and the jet of atomized reactant must be maintained at a temperature sufficiently above its melting point to prevent plugging. In addition, the velocity of water in the jets must be sufficiently high to completely freeze the reactants, thereby preventing the formation of large lumps of reactant which would interfere with transmitting the slurry through conduit 40 and successive conduits.

In an example of the process of the present invention, ethylene, together with a molecular oxygen catalyst, was compressed to 30,000 p. s. i. and fed to a heater having a 3/16-inch inside diameter and a length of 60 feet at a rate of 29.3 pounds per hour. In an average time of 45 seconds at 175° C., 21.7 percent of the ethylene was converted to the polymer. The reaction mass of the polymer and unreacted ethylene was reduced in pressure intermittently to approximately atmospheric pressure by valve means such as shown in the drawing. The molten atomized polymer and gas entered a heated tube maintained at 190° C. and emerged from the tube, mixing with 4 converging radial jets of water having a total water flow of 50 gallons per hour. The average velocity from the 3/16-inch inside diameter heated tube was 700 feet per second. This high velocity succeeded in keeping the heated tube clear of polymer and in producing powdered polymer of small particle size.

The powdered polymer, polyethylene, had a melt index of 5.56 and a density of .9150 gm./cc. which corresponds to a crystalline melting point of 112° C. The polymer was in the form of a fine powder which, after separating from the unreacted monomer and drying, was found to have the following particle size: 84.7 percent by weight through 20 mesh; 61.4 percent through 40 mesh; 1.7 percent through 80 mesh; 1.0 percent through 200 mesh; and 0.8 percent through 325 mesh.

The polymer may be useful where a powdered form is necessary as in flame-spraying.

In another example, the conditions maintained in the above example were repeated with the exception that the total flow of monomer and polymer was reduced to 5.46 pounds per hour and the average velocity of the reactant jet was reduced to approximately 126 feet per second. Under these conditions continuous successful operation was obtained, producing a powdered polymer having a melt index of 1.53 and a density of 0.9170 gm./cc.

In a further example, hydrogen and isopropanol were introduced simultaneously to the reactor with ethylene to produce a very low molecular weight, waxy polymer. The conversion of ethylene to polymer was 29.1 percent and the ethylene flow rate was 30 pounds per hour. The reaction mass entered the injector tube which was heated to 190° C. The polymer had a melt index of 31,000 and a density of 0.9147 gm./cc. The resultant product upon quenching was a fine powder.

In a still further example, a polymer of low melt index (0.16) was produced by employing a very low catalyst concentration. The conversion was 0.29 percent and the ethylene flow rate 28.4 pounds per hour. Again a powdered polymer was produced without difficulty.

What is claimed is:

1. A process for the production of a powdered polymer of ethylene comprising the steps of providing in a high pressure, high temperature zone a molten reaction product containing the polymer together with unreacted gaseous monomer, removing the reaction product from said zone and atomizing said reaction product by releasing such product to substantially atmospheric pressure thereby converting the molten mass into a high temperature high velocity jet stream, and injecting the atomized reaction product-containing jet stream into a quenching fluid stream to rapidly cool and freeze the atomized reaction product, thereby forming a separable finely powdered polymer.

2. A process for the production of a powdered polymer of ethylene comprising the steps of providing in a high pressure, high temperature zone a molten reaction product containing the polymer together with unreacted gaseous monomer, removing the reaction product from said zone and atomizing said reaction product by releasing such product to substantially atmospheric pressure thereby converting the molten mass into a high temperature jet stream having a velocity in excess of 100 feet per second, and injecting the atomized reaction product-containing jet stream into a quenching fluid stream to rapidly cool and freeze the atomized reaction product, thereby forming a separable finely powdered polymer.

3. A process for the production of a powdered polymer of ethylene comprising the steps of providing in a reaction zone a molten high pressure reaction product containing the polymer together with unreacted gaseous monomer, removing the reaction product from the reaction zone at a high pressure and atomizing said reaction product by releasing such product to substantially atmospheric pressure thereby converting the molten mass into a high temperature high velocity jet stream, and injecting the atomized reaction product-containing jet stream into a quenching fluid stream to rapidly cool and freeze the atomized reaction product, thereby forming a separable finely powdered polymer.

4. A process for the production of a powdered polymer of ethylene comprising the steps of providing in a reaction zone a molten high pressure reaction product containing the polymer together with unreacted gaseous monomer, removing the reaction product from the reaction zone at a high pressure and atomizing said reaction product by releasing such product to substantially atmospheric pressure thereby converting the molten mass into a high temperature jet stream having a velocity in excess of 100 feet per second, and injecting the atomized reaction product-containing jet stream into a quenching fluid stream to rapidly cool and freeze the atomized reaction product, thereby forming a separable finely powdered polymer.

References Cited in the file of this patent

FOREIGN PATENTS 609,560    Great Britain _____ Oct. 4, 1948